United States Patent [19]
Tago et al.

[11] Patent Number: 5,436,892
[45] Date of Patent: Jul. 25, 1995

[54] APPARATUS AND METHOD FOR PACKET COMMUNICATIONS

[75] Inventors: Kazuya Tago, Matsudo; Yasushi Negishi; Mikako Hoshiba, both of Tokyo, all of Japan

[73] Assignee: International Business Machines Corporation, Armonk, N.Y.

[21] Appl. No.: 343,618

[22] Filed: Nov. 22, 1994

Related U.S. Application Data

[63] Continuation of Ser. No. 85,700, Jun. 30, 1993, abandoned.

[30] Foreign Application Priority Data

Jul. 2, 1992 [JP] Japan .................................. 4-175297

[51] Int. Cl.$^6$ ............................................. H04L 12/56
[52] U.S. Cl. ...................... 370/60; 370/94.1; 370/99; 364/238; 364/242.3; 364/242.94
[58] Field of Search ............... 370/60, 94.1, 99, 110.1; 364/238, 239.3, 242.3, 242.31, 242.32, 242.34, 242.94, 242.95, 242.96

[56] References Cited

U.S. PATENT DOCUMENTS

| | | | |
|---|---|---|---|
| 4,354,263 | 10/1982 | Bordry et al. | 370/60 |
| 4,768,190 | 8/1988 | Giancarlo | 370/85.15 |
| 4,951,278 | 8/1990 | Biber et al. | 370/60 |
| 5,325,361 | 6/1994 | Lederer et al. | 370/94.1 |

FOREIGN PATENT DOCUMENTS 62-278843 12/1987 Japan ........................ H04L 11/00

Primary Examiner—Douglas W. Olms
Assistant Examiner—Russell W. Blum
Attorney, Agent, or Firm—Paul S. Drake

[57] ABSTRACT

An apparatus and method for enabling disassembly of packets into their components and for assignment of main storage areas without software intervention in the reception processing of a communications network. Direct partition is enabled by hardware without intervention of software by adding control information directly accessible by the receiving DMA feature 6 to each communications packet. The transmitting DMA feature 6 transfers the contents of the DMA command queue to the communications control unit 7 before transferring the data in computer storage 10 to the communications control unit 7. This information is added to the top of each packet before being passed to the receiving end. The receiving DMA feature 6 transfers each whole packet not to a single reception buffer but to different reception buffers in element data units by use of both this information and the information in the DMA command queue at the receiving end. Communications software makes use of each reception buffer as it is without copying it onto another area.

16 Claims, 4 Drawing Sheets

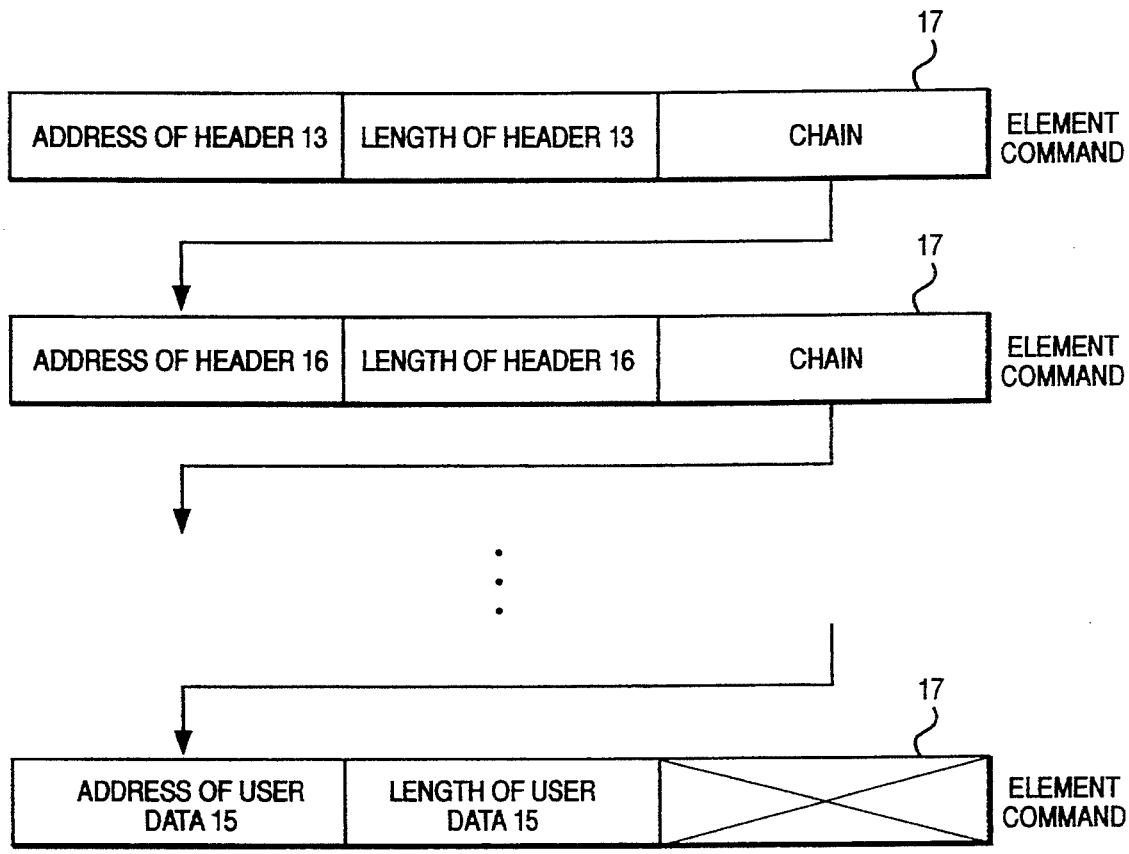
FIG. 3   PRIOR ART
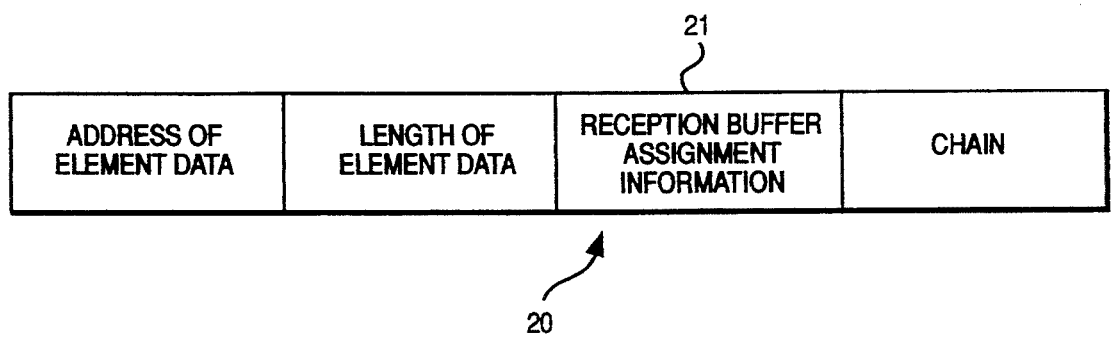
FIG. 4   ELEMENT COMMAND

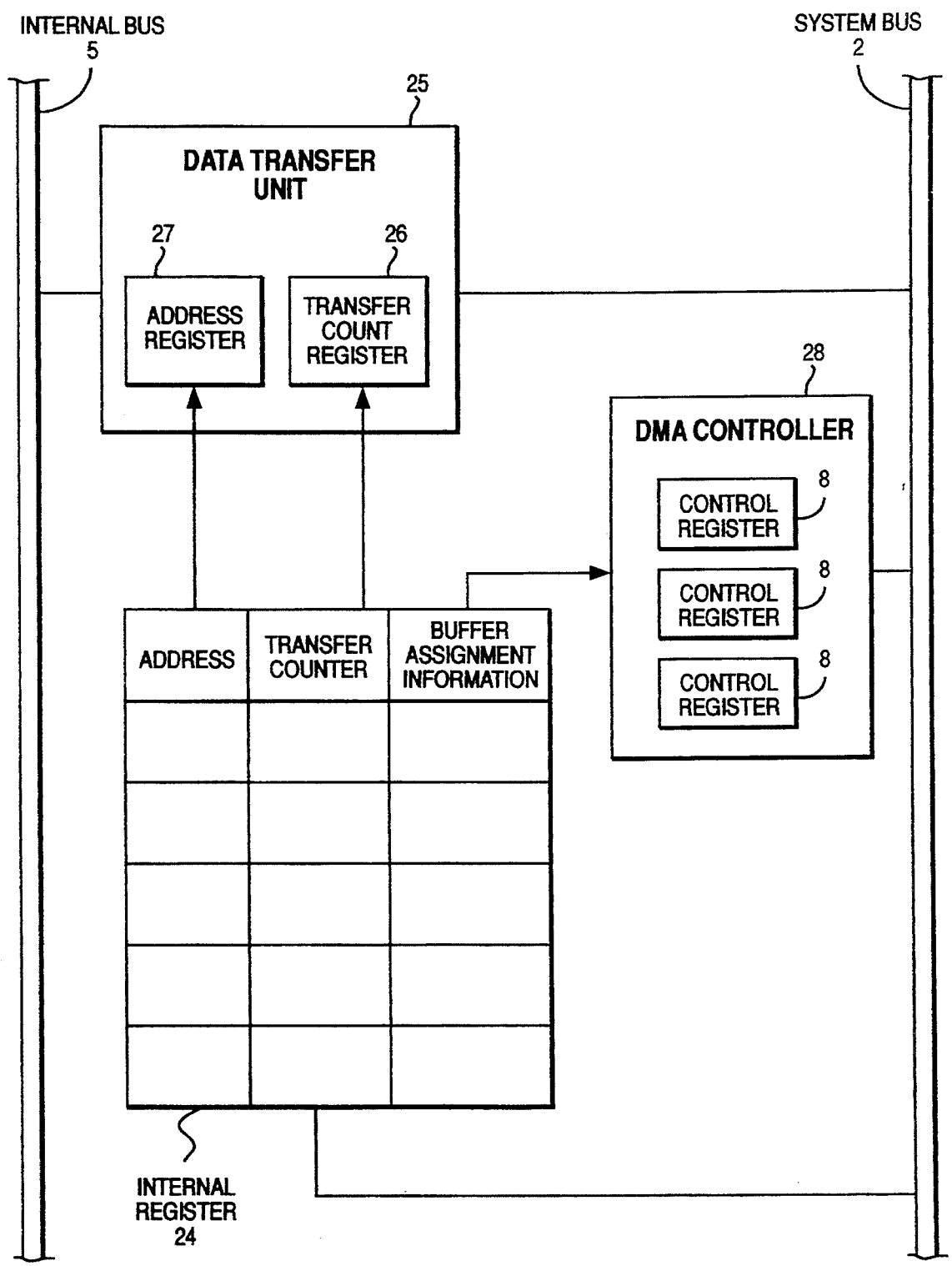
FIG. 6  DMA FEATURE

APPARATUS AND METHOD FOR PACKET COMMUNICATIONS

This is a continuation of application Ser. No. 08/085,700 filed Jun. 30, 1993, now abandoned.

TECHNICAL FIELD

This invention relates in general to a communication systems and more particularly to apparatus and method for packet communications.

BACKGROUND ART

FIG. 1 shows the configuration of a communications feature based on a conventional protocol and a communications interface unit. The communications interface unit 1 is connected to a computer 3 via a system bus 2 and is directly connected to network communications media 4. In the communications interface unit 1, there are a direct memory access (DMA) feature 6 and a communications control feature 7, which are connected to each other by an internal bus 5. In the DMA feature 6 and communications control feature 7, there are control registers 8 and 9. The computer 3 gains access to these registers 8 and 9 via the system bus 2 to control the operation of the communications interface unit 1. The DMA feature 6 directly interacts with the main storage 10 of the computer 3 via the system bus 2, prepares transmission data, and stores received data. The communications control feature 7 drives the communications media 4 and exchanges packets. Also, computer 3 has a CPU 11.

The packet transmission process is described in the following. Data to be transmitted typically consists of data elements distributed in a number of areas in the main storage 10 of the computer 3. The communications interface unit 1 collects such data elements through the DMA feature 6, assembles the data elements into a single packet, and then sends the packet across the communications media 4. According to the example shown in FIG. 2, two packet headers 13 and 16 and three user data 12, 14, and 15 corresponding to the protocol layer are collected and sent. That is, data to be transmitted consists of five data elements.

To collect component elements, the communications control program creates a command queue in the main storage 10 and sets its leading address in the control register 8 of the DMA feature 6. FIG. 3 shows the structure of the command queue required for sending out the data shown in FIG. 2. Each element command 17 in the command queue corresponds to one data element. After the DMA feature 6 is activated, data transfer will start as a transfer start command is given to the control register 9 of the communications control feature 7. The DMA feature 6 reads the address and the length fields of each element command in the command queue, reads data out of the main storage, and transfers the data to the communications control feature 7 via the internal bus 5. The communications control feature 7 produces a packet from the data and sends the packet to the communications media 4.

At the receiving end, the DMA feature 6 must be activated in advance with a plurality of reception buffers assigned by software prior to the arrival of a packet so that a plurality of packets can be received in succession. This is implemented by concatenating a plurality of element commands including addresses and lengths for the respective reception buffers into a DMA command queue. The size of each reception buffer must be set so that the longest packet can be retained.

The communications control feature 7 transfers received packets to the DMA feature 6. The DMA feature 6 dequeues one element command from the DMA command queue and transfers the data to the reception buffer beginning at the address entered. One packet is retained in one reception buffer. The communications control software analyzes the contents of the packet, reads the header, and thus obtains information as to element data count and length. This information agrees with the information provided from the sending software for the DMA feature 6 by the DMA command queue at the transmitting end. This software assigns anew a main storage area to each of the components, copies data from the reception buffer, and thus disassembles the data into components. The reception buffers are then linked to the receiving DMA command queue for reuse.

PUPA No. 62-278843 discloses using DMA to make a protocol converse on in a gateway between heterogeneous networks. The first DMA transfer frequency is counted to facilitate the second DMA transfer on the basis of the counted value. Yet, there is no mention of the transfer of packets including DMA information. By contrast, the present invention embodies the novel concept that assemblage information (i.e. information beyond protocol requirements) should be inserted into packets.

DISCLOSURE OF THE INVENTION

Although conventional systems allow data distributively located in a plurality of computer storage area to be collected by hardware, partition at the receiving end used to be effected by software. This restriction presented problems in respect to performance and storage utilization efficiency because of necessitated assignment of intermediate reception buffer areas and necessitated data copying. This invention is intended to improve the performance of communications systems by enabling this division to be effected directly by the DMA feature at the receiving end.

This invention is intended to enable hardware to effect direct partition without any software intervention by adding on control information directly accessible by the receiving DMA feature to communication packets. The DMA feature at the transmitting end transfers the contents of the DMA command queue to the communications control unit before transferring data in computer storage to the communications control unit. This information is added to the top of each packet which is transferred to the receiving end. The receiving DMA feature transfers data in a packet not to a single reception buffer but to separate reception buffers assigned for the respective element data by use of both this information and the information in the receiving DMA command queue. The communications software avails itself of each reception buffer as it is without copying the information onto other areas.

This invention enables analysis of packet contents and assignment of main storage areas to respective components to be simultaneously effected by DMA features upon packet reception.

A further understanding of the nature and advantages of the present invention may be realized by reference to the remaining portions of the specification and the drawing.

BRIEF DESCRIPTION OF THE DRAWING

FIG. 3 illustrates of the structure of a command chain for directing the execution of DMA in the configuration shown in FIG. 1;

FIG. 4 illustrates the structure of each element command in the DMA command chain used in this embodiment;

FIG. 6 is a block diagram of the configuration of the DMA feature 6 used in this embodiment.

BEST MODE FOR CARRYING OUT THE INVENTION

Figure 1:
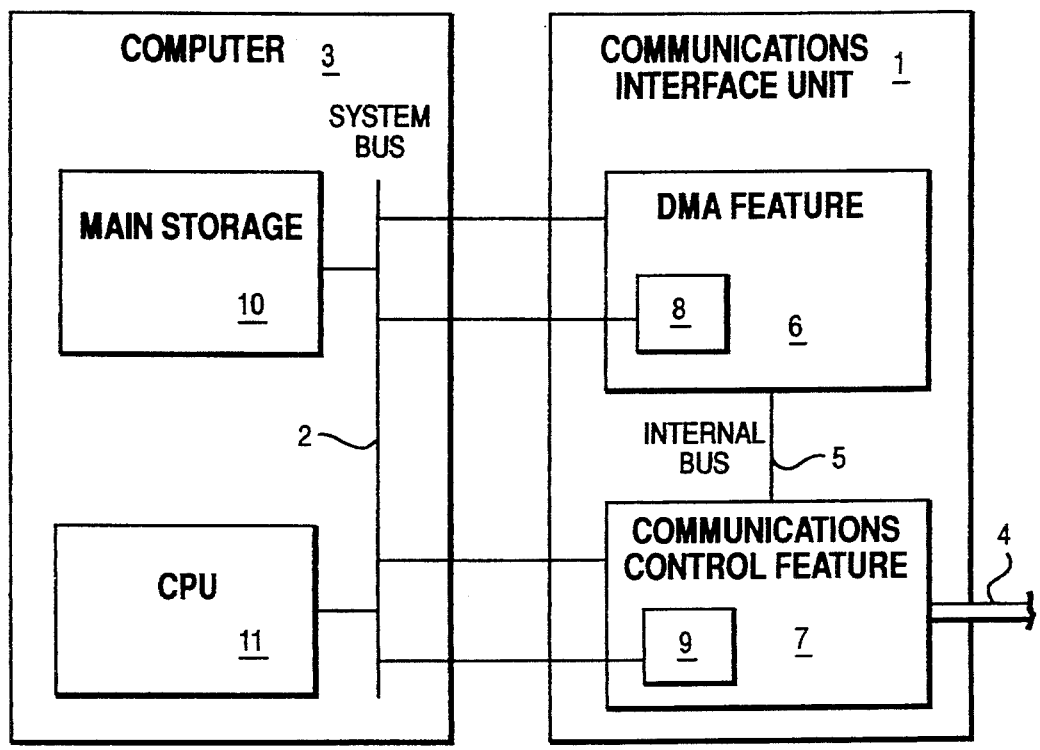
FIG. 1 is a block diagram of the overall configuration (a conventional example) of a computer system with a communications interface unit.
Figure 2:
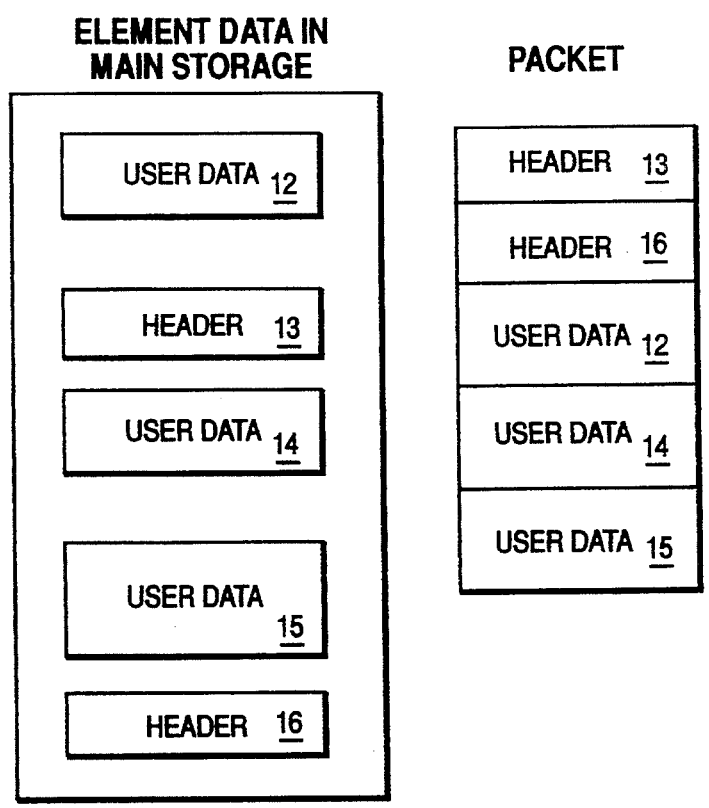
FIG. 2 illustrates of the element data stored in the main storage and a packet into which the element data is assembled in the configuration shown in FIG. 1.

An embodiment of this invention will be explained in the following. The configuration of the entire communications mechanism of this embodiment is identical with that of the conventional system shown in FIG. 1. The specifications of the DMA feature 6 and the structure of packets are altered. In the following, reference will be made also to FIG. 1 insofar as it is applicable to the embodiment.

Figure 5:
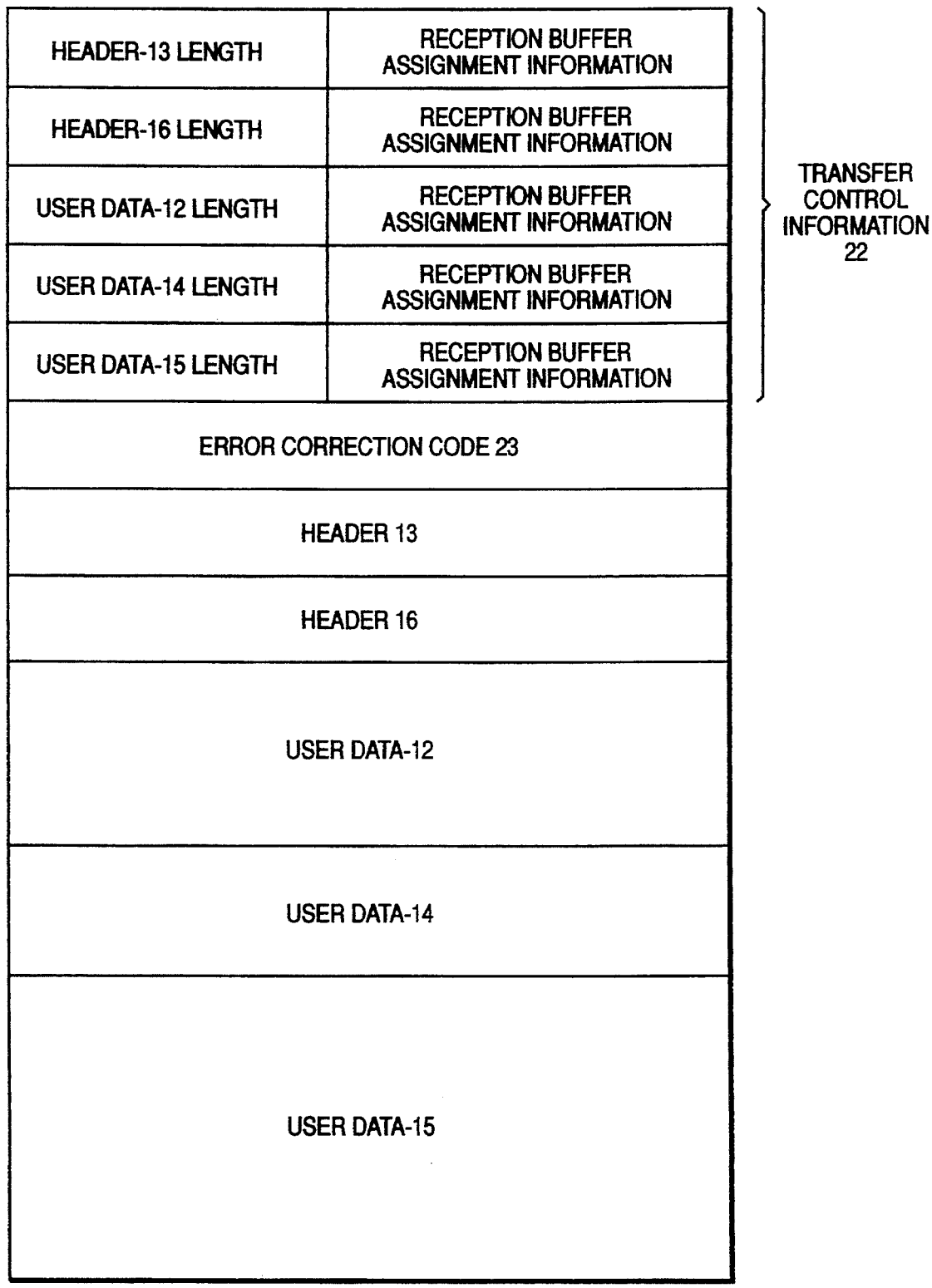
FIG. 5 illustrates the structure of each packet used in this embodiment.

First, processing at the transmitting end is described below. FIG. 4 shows a command queue element command 20 given to the DMA feature 6 at the transmitting end. The element command 20 is extended so that reception buffer assignment information 21 to be given to the DMA feature 6 at the receiving end can be added along with the address and the length of element data to be transmitted. The element command 20 is similar in the other respects to the conventional element command 17. The software at the transmitting end produces a command queue, sets its leading address in the control register 8 of the DMA feature 6, and then activates the communications control feature 7. The DMA feature 6 transfers the contents of the command queue to the internal register 24, which will be detailed later, before starting the transfer of element data. The DMA feature 6 also transfers information as to the length of the element data and reception buffer assignment of the information entered in the command queue to the communications control feature 7 and then transfers the element data. Similar to the conventional system the communications control feature 7 assembles data transferred from the DMA feature 6 into packets and sends the packets. Thus, the structure of a packet is as shown in FIG. 5. Transfer control information 22 is added anew as the header to which a dedicated error correction code 23 is added to enable an error check on this part alone to be conducted on the part of the receiving end.

Second, reception processing is described below. At the receiving end, if the communications control feature 7 receives a packet, an error check is run on the transfer control information 22 at the top of the packet, which is then transferred to the DMA feature 6. Similar to the conventional system, a plurality of reception buffers have been set as a command chain in the DMA control register 8 beforehand. Yet, the reception processing of this invention differs from that of the conventional system in that a plurality of types of reception buffers differing in length from one another can be used because a plurality of control registers 8 are provided for the DMA feature 6 to implement a plurality of types of command chains. Reception buffer assignment information as part of the transfer control information 22 is used for reception buffer selection and transfer mode designation. There are two transfer modes available: one such that reception buffers are assigned and element data is then transferred to the reception buffers; the other such that only reception buffers are assigned.

The essential parts of the DMA feature 6 are described with reference to FIG. 6. Upon receiving a packet, the DMA feature 6 temporarily retains transfer control information 22 in the internal register 24. The DMA feature 6 then fetches its leading element from the internal register 24 and sets the length field in the DMA transfer counter register 26 of the data transfer unit 25. The DMA feature 6 then fetches one element from a command chain with a number corresponding to the reception buffer number in the reception buffer assignment information 21 and sets the element data in the DMA register 27. DMA is thus started, and the element data in the packet is transferred to the main storage 10. Also, the address is retained in the internal register 24. The contents of the packet are all transferred to the main storage 10 by repeating the above steps until the transfer control information 20 is exhausted. 28 is a DMA controller.

After the termination of transfer, the DMA feature 6 transfers the contents of the internal register 24 retaining transfer control information 22, to main storage. The communications software identifies where the contents of the packet have been distributively stored by reference to the data in main storage. The control software can make use of received data individually in element data units without entailing packet content analysis, main storage area assignment, or data transfer. Hence, element data is used as it is without recopying it. The element data thus used is enqueued into the command queue of the DMA feature 6 for reuse.

This invention has a marked advantage when it is attempted to transfer page frames in the main storage. The main storage is used in about 4K-byte long page frames beginning at addresses in 4K-byte units. When one such page frame is to be transferred between computers, data as an element in the packet must be stored in a frame with a start address in 4K-byte units. In the conventional system, it transferring data from reception buffers to page frames was indispensable in order to transfer element data to an area whose start address is thus restricted. By contrast, this invention enables received data to be transferred directly to page frames without copying it through registering page frames as reception buffers in the DMA command chain beforehand.

As has been described so far, this invention enables disassembly of every packet into its components and assignment of main storage areas without any intervention of software in the reception processing of a communications network. This advantage helps reduce the processing load of the receiving software and the abuse of main storage area.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A communications system for communicating using packets of data comprising:
   a) means for including data in a packet according to a prescribed protocol;
   b) means for including control information in said packet for controlling disassembly of said packet, said control information including information which directs partitioning of the packet into a plurality of portions and indicates, for each portion, which one of a plurality of reception buffers is to receive the portion for storage; and
   c) means for transmitting said packet including said control information.

2. The communications system of claim 1 further comprising:
   a) means for receiving said transmitted packet including said control information; and
   b) means for extracting data from said received packet utilizing said control information included in said packet.

3. The communications system of claim 2 wherein said means for including control information includes means for including a length of the data in the packet.

4. The communications system of claim 3 wherein said means for including data and said means for extracting data each include means for utilizing DMA transfers.

5. A method for communicating using packets of data comprising the steps of:
   a) including data in a packet according to a prescribed protocol;
   b) including control information in said packet for controlling disassembly of said packet, said control information including information which directs partitioning of the packet into a plurality of portions and indicates, for each portion, which one of a plurality of reception buffers is to receive the portion for storage; and
   c) transmitting said packet including said control information.

6. The method of claim 5 further comprising the steps of:
   a) receiving said transmitted packet including said control information; and
   b) extracting data from said received packet utilizing said control information included in said packet.

7. The method of claim 6 wherein the step of including control information includes including a length of the data in the packet.

8. The communications system of claim 7 wherein said step of including data and said step of extracting data each include a step of utilizing DMA transfers.

9. A computer comprising:
   a) processing means for processing data;
   b) memory means for storing data to be processed; and
   c) a communications system coupled to said processing means and said memory means for communicating using packets of data including:
      i) means for including data in a packet according to a prescribed protocol;
      ii) means for including control information in said packet for controlling disassembly of said packet, said control information including information which directs partitioning of the packet into a plurality of portions and indicates, for each portion, which one of a plurality of reception buffers is to receive the portion for storage; and
      iii) means for transmitting said packet including said control information.

10. The computer of claim 9 wherein said communications system further includes:
    a) means for receiving said transmitted packet including said control information; and
    b) means for extracting data from said received packet utilizing said control information included in said packet.

11. The computer of claim 10 wherein said means for including control information includes means for including a length of the data in the packet.

12. The computer of claim 11 wherein said means for including data and said means for extracting data each include means for utilizing DMA transfers.

13. A computer network system comprising a plurality of computers, each computer including a communications system for communicating across a communications medium, each communications system including:
    a) means for including data in a packet according to a prescribed protocol;
    b) means for including control information in said packet for controlling disassembly of said packet, said control information including information which directs partitioning of the packet into a plurality of portions and indicates, for each portion, which one of a plurality of reception buffers is to receive the portion for storage; and
    c) means for transmitting said packet including said control information onto said communications medium.

14. The computer network system of claim 13 wherein said communications system further includes:
    a) means for receiving said transmitted packet including said control information from said communications medium; and
    b) means for extracting data from said received packet utilizing said control information included in said packet.

15. The computer network system of claim 14 wherein said means for including control information includes means for including a length of the data in the packet.

16. The computer network system of claim 15 wherein said means for including data and said means for extracting data each include means for utilizing DMA transfers.

* * * * *